Nov. 23, 1937.  F. P. LACKINGER  2,100,080
UTENSIL
Filed July 26, 1935
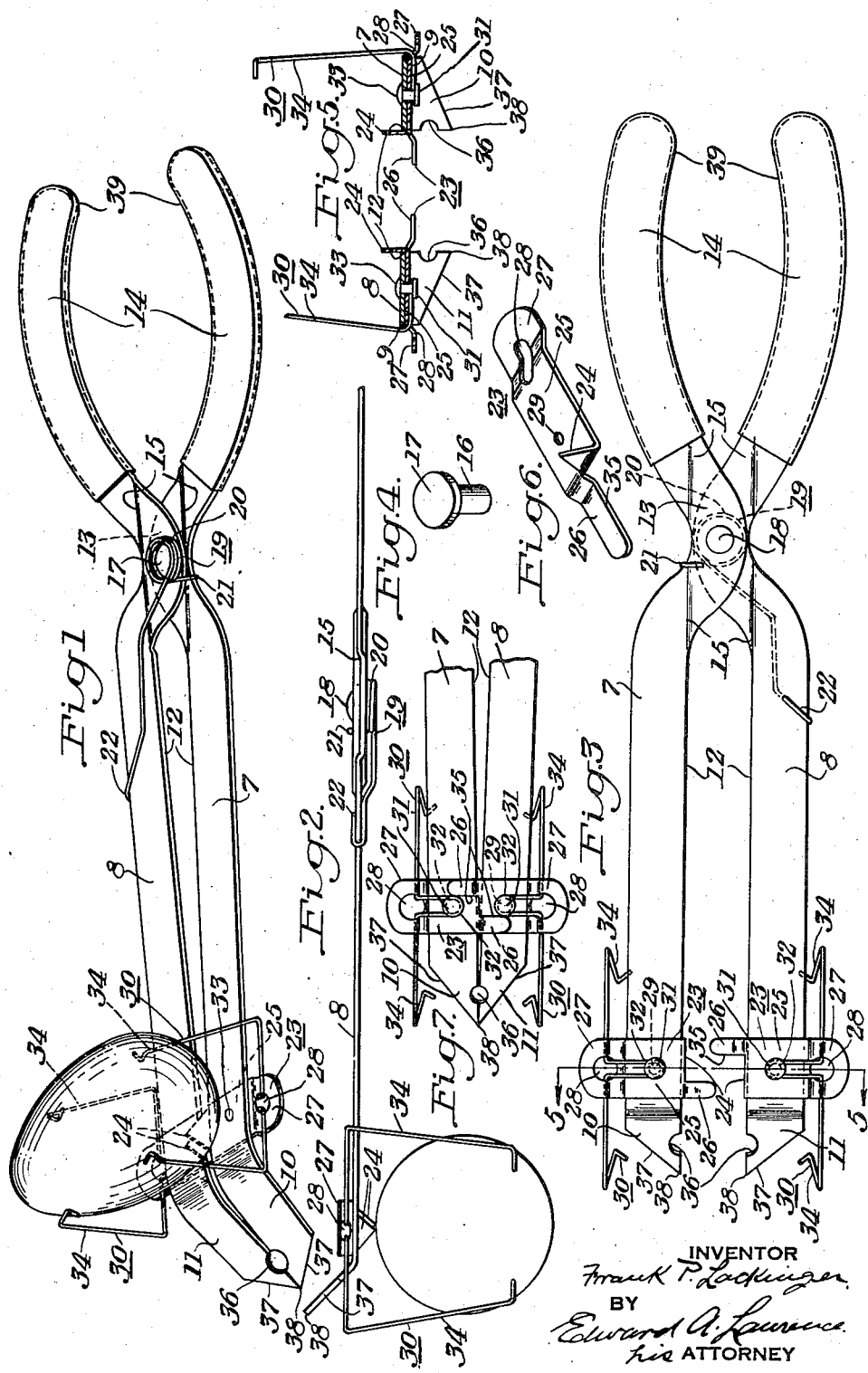
INVENTOR
Frank P. Lackinger
BY Edward A. Lawrence
his ATTORNEY Patented Nov. 23, 1937

2,100,080

UNITED STATES PATENT OFFICE 2,100,080

UTENSIL

Frank P. Lackinger, McKees Rocks, Pa.

Application July 26, 1935, Serial No. 33,226

10 Claims. (Cl. 146—2)

My invention relates generally to an implement for grasping and lifting articles of various kinds, as for instance articles of food and articles too hot to be touched by the hand.

The primary purpose for which I have designed my improved implement is that of egg handling, the opening of eggs, and the separation of the whites and yolks thereof when desired.

However, my invention may be advantageously employed for many other purposes, such as for lifting ice-cubes, turning or lifting meats, potatoes and other foods while cooking, removing articles from a mass, handling articles with which it is undesirable for the hand to contact, and for many other purposes too numerous to catalogue but which will suggest themselves.

Other objects, advantages and means to effect the same will appear from the following description.

In the accompanying drawing wherein I have illustrated a practical embodiment of the principles of my invention, Fig. 1 is a perspective view showing the device grasping an egg.

Fig. 2 is a side elevation of the device.

Fig. 3 is an inverted plan view of the device showing the working ends diverged.

Fig. 4 is a perspective view of the pintle pin which holds the device in assembly.

Fig. 5 is a sectional view taken along the lines 5—5 of Fig. 3.

Fig. 6 is a detailed perspective view showing one of the brackets.

Fig. 7 is a broken inverted plan view of the working ends of the device when closed.

Referring to the drawing, 7 and 8 represent a pair of tong arms which are preferably made of flat or rolled wire and of any suitable material. The edges are preferably rounded as at 9 to render them unobjectionable to the hands when gripped. The arms 7 and 8 are duplicate pieces except that the working ends 10 and 11 are bent approximately forty-five degrees in opposite directions from the general plane of the arms to form right and left tong members. The bent portions also add strength and rigidity to the working ends of the arms.

Each arm is shaped to provide four sections, namely, the angularly disposed working ends 10 and 11, the straight shanks 12 which represent the material in its original condition, the offset sections 13 which mate to form the hinge section, and the curved portions 14 which form the handles.

The offset hinge sections 13 are also formed in a plane above and parallel with the common plane of the normal material to the extent of one-half of the thickness of said material, as indicated at 15. Thus when a pair of arms are assembled to form tongs the other three sections of the two arms are in the same plane.

The offset hinge portions 13 are drilled to receive the shank 16 of the pintle rivet shown in Fig. 4 which holds the arms in assembled relation between the rivet head 17 and the peened end 18 of the shank 16.

19 represents a wire spring which is preferably provided with a coil 20 of two complete turns and the short and long hooked ends 21 and 22. The short arm 21 of the spring 19 is hooked around the offset hinge section 13 of the arm 7, from whence it winds around the rivet head 17 to form the coil 20, then over and down in the long end 22, hooking over the straight shank 12 of the arm 8. The spring 19 is provided with an initial tension when assembled on the tongs to maintain the working ends 10 and 11 in their closed position. When the handles 14 are drawn together the arms 7 and 8 pivot on the shank of the rivet and the working ends open, thereby increasing the pressure of the spring which tends to draw them together.

The outer ends of the straight shank sections are provided with the brackets 23, one of which is shown in Fig. 6. These brackets are preferably made of a high grade cutlery steel since they are provided with sharp puncturing spurs 24 bent normal to the body 25 of said bracket. The body of the bracket is extended to form the offset guiding finger 26 adjacent the spur on one end. The other end of the body is offset downwardly and outwardly as shown at 27. At the bend of the offset the bracket is provided with the hole 28. 29 represents a hole in the body 25 of the bracket for securing it to the arms 7 and 8.

30 represents a pair of grasping fingers which are preferably made of spring or music wire. Each pair of fingers is formed from one piece of wire which is looped around the shank and held by the head of the rivet 31 as shown at 32 in Figs. 3 and 5. The shank of the rivets 31 pass through the holes 29 of the brackets 23 and through the arms 7 and 8 and is peened over on the top thereof as shown at 33 in Fig. 5. Thus the rivets 31 secure the grasping fingers and the brackets to the tong arms.

The wire which forms the two fingers extends outwardly through the hole 28 in the offset portion of the bracket end 27. Each portion is bent ninety degrees in opposite directions and in the same plane, thereby locking the wire against movement between the rivet and the offset portion. The fingers 34 are then formed by bending the wire ends upwardly in a plane substantially normal to said first mentioned plane. I find that it is preferable that each set of fingers converge slightly as they extend from the tongs and have an inturned kink to provide a supporting grasp as shown in Fig. 2 and to assist in flexing said fingers around the article to be grasped.

Owing to the abutment of the flat side of the spurs 24 against the inner edges of the arms 7 and 8 the brackets 23 are held from rotating and only one rivet 31 is necessary to secure each bracket.

When the hand releases the pressure on the handles of the tong arms the working ends converge and the guiding finger 26 of each bracket makes a sliding contact with the bottom of the opposite bracket and the inner edges 35 of the fingers engage the looped wire 32 of the grasping fingers 30 under the head of the rivet 31 as shown in Fig. 7. These fingers thus guide the working ends of the tong arms together and lock them in alignment when they are closed.

It should be noted, see Fig. 7, that the outer flat sides of the spurs 24 engage when the tongs are closed and the angularly disposed working ends have a slight clearance therebetween. This is to insure that the piercing point or apices of the spurs will be closely adjacent one another when the tongs are closed. The apices of the spurs may be made to be coincident or one may be set in advance of the other. However, the edge of the spur adjacent the guiding finger is beveled or formed so as to bring the apices substantially within a plane which passes between the angularly disposed working ends and the fulcrum point of the tongs. The formation of these spurs may be accomplished by properly forming the die which stamps out the bracket 23 or by grinding or otherwise beveling said sides where the spurs overlap.

36 represent notches formed in the inner edges of the angularly disposed working ends 10 and 11 which are arranged to mate and form a hole when the tong arms are closed. These notches are provided to permit the operator to lift hot lids and the like by their knobs or handles.

The working ends 10 and 11 are cut away diagonally as shown at 37 to provide the pointed finger tips 38. This facilitates in removing specks or foreign matter from foods and turning bacon and the like. Another important function of these finger tips is to insure substantially uniform pressure to the spurs 24 when the tips of the tongs are tapped upon a table surface for breaking an egg held by the grasping fingers. With these pointed ends and the locking feature of the guiding fingers 26 it is highly improbable that the egg will not be properly punctured regardless of the angle the tongs are held when the tongs are tapped on a table surface. On the other hand if the finger tips 38 were wide all of the force might be transmitted through one arm to one spur and this would lead to impairment of the implement.

To lift an article, the handles are grasped to spread the working ends and the spread fingers are placed at either side or end of the article. When the working ends are permitted to converge, the fingers grasp the article, which may then be lifted. To release the article, the handles are again pressed together, thus spreading the working ends.

An egg may be grasped in this manner and held as illustrated in Figs. 1 and 2. By then tapping the finger tips 38 on a table or other surface the spurs 24 are driven through the shell of the egg.

To prevent puncturing the yoke of an egg the handles of the tongs should be elevated so that the shock of tapping them on a table surface or edge will not throw the yoke to the place where the spurs penetrate the shell.

When one becomes skilled in manipulating this device he will find that he is able to pick up the egg and pierce it with the spurs without opening the tongs as shown in Fig. 2.

It will be noted from Figs. 1 and 3 that the shanks 12 are converging when the working ends are closed. As the handles are drawn together the spurs separate and scribe an arc whose radius is determined by the length of the shanks 12. I have proportioned the sections of my tongs to provide substantially a straight pull between the spurs as the egg shell is cracked open by drawing the handles together. This straight pull breaks the egg shell cleanly about its circumference and thereby avoids small pieces of egg shell in the dispensed egg. Again by only partially opening the egg shell I am enabled to separate the white from the yoke. After permitting the egg to drop out of the shell I can flick the shell-halves out of the grasping fingers and the spurs by opening the tongs widely.

39 represents heat insulating handles which may be slipped over the handles 14 and thereby insulate the operator's hand when using the device for boiling or dyeing eggs or similar operations which may cause the working end of the tongs to become quite hot.

It is obvious that my improved device is characterized by extreme simplicity of construction, requiring but two dies to form the tong arms and a third die to form the brackets. Thus the device may be manufactured and sold with a profit at a price which is a mere fraction of the cost of materials and manufacture of other devices designed for the same uses. Again its simplicity renders the device more durable and less likely to require repairs.

In addition to its use as a device for breaking eggs and for other kitchen purposes, my device is available for numerous other uses about the house or shop.

I claim:—

1. In a hand tool, the combination of a pair of tong arms in pivotal relation and arranged to spread when the handles are drawn together, the working ends of said arms having a straight shank section and an angularly disposed section at the ends thereof, brackets secured to said arms adjacent said angularly disposed sections and held in alinement thereby, article grasping fingers held by said brackets, and guiding fingers on said brackets for guiding and locking said arms when said grasping fingers handle an article.

2. In a hand tool comprising a pair of tong arms in pivotal relation forming handle and working ends, the combination of brackets mounted on the working ends, grasping fingers secured with the brackets to the working ends, and means on said brackets for holding said fingers in alinement.

3. In an article grasping device, the combination of a pair of tong arms in pivotal relation forming working ends and handle ends, means on the working ends for locking them in alinement when they come together, and grasping fingers held by said means for handling an article.

4. A bracket for use on an article handling device comprising a body portion, a downwardly and outwardly extending end portion having a slotted hole therein, the other end of the bracket being provided with a downwardly and outwardly extending guiding finger.

5. An article handling device comprising a bracket, a grasping finger having a base portion and outwardly converging arms extending from the ends of the base portion, a loop formed in the base portion, and means for securing the bracket to the device, said loop being arranged to secure the grasping finger to the bracket.

6. An article handling device comprising a bracket offset at one end thereof, a grasping finger having a base portion and outwardly converging arms extending from the ends of the base portion, a loop formed in the base portion, and means for securing the bracket to the device, said loop being arranged to encompass the securing means to hold the base portion of the finger against the offset portion of the bracket to secure the parts in assembled relation.

7. In a bracket for use on an article handling device comprising a body portion, a downwardly and outwardly extending end portion having a slotted hole therein, the other end of the bracket being provided with a downwardly and outwardly extending guiding finger and an upwardly extending spur.

8. An article handling device comprising a pair of tong arms in pivotal relation forming handles and working ends, brackets mounted on the working ends, grasping fingers adjacent the outer side of the working ends held in position by said brackets, and means on said brackets adjacent the inner side of the working ends for piercing an article held by said fingers.

9. In an article-grasping device, the combination of a pair of tong arms pivotally connected intermediate of their ends to form working ends and handle ends and arranged so that when the handle ends converge the working ends diverge and vice versa, and grasping means comprising a base portion extending longitudinally on the outer side of each of the working ends and secured thereto intermediate of its ends, a finger extending outwardly from the ends of said base portions, said fingers converging to facilitate in holding an article in any position.

10. In a one hand tool for breaking eggs, the combination of a pair of tong arms in pivotal relation and arranged to spread when the handles are drawn together, grasping means comprising a base portion extending longitudinally on each side of the working ends and secured thereto intermediate of its ends, a finger extending upwardly from the ends of said base portions, and a spur secured to each working end at the inner side thereof and triangularly disposed with respect to the fingers on said working end for piercing and holding the shell of an egg with the fingers when the working ends are separated.

FRANK P. LACKINGER.